US011196853B2

(12) United States Patent
Thorington (10) Patent No.: US 11,196,853 B2
(45) Date of Patent: Dec. 7, 2021

(54) CONNECTION AND DISCONNECTION OF SHARED AUDIO ENDPOINT

(71) Applicant: Plantronics, Inc., Santa Cruz, CA (US)

(72) Inventor: Brent John Thorington, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 181 days.

(21) Appl. No.: 16/383,395

(22) Filed: Apr. 12, 2019

(65) Prior Publication Data

US 2019/0320054 A1  Oct. 17, 2019

Related U.S. Application Data

(60) Provisional application No. 62/657,627, filed on Apr. 13, 2018.

(51) Int. Cl.
*H04W 76/20* (2018.01)
*H04M 1/72412* (2021.01)
*H04W 4/80* (2018.01)
*H04R 3/00* (2006.01)
*H04W 76/15* (2018.01)

(52) U.S. Cl.
CPC .......... *H04M 1/72412* (2021.01); *H04R 3/00* (2013.01); *H04W 4/80* (2018.02); *H04W 76/15* (2018.02); *H04W 76/20* (2018.02)

(58) Field of Classification Search
CPC ....... H04W 4/80; H04W 76/34; H04W 84/18; H04W 76/20; H04W 76/15
See application file for complete search history.

(56) References Cited

U.S. PATENT DOCUMENTS

| 2014/0003372 | A1* | 1/2014 | Qian | H04W 52/0229 |
| | | | | 370/329 |
| 2015/0195857 | A1* | 7/2015 | Pan | H04W 76/10 |
| | | | | 455/41.3 |
| 2016/0227381 | A1 | 8/2016 | Bargetzi et al. | |
| 2016/0275556 | A1* | 9/2016 | Shanmugam | H04W 4/80 |
| 2017/0040817 | A1* | 2/2017 | Hu | H02J 7/007182 |
| 2017/0085751 | A1* | 3/2017 | Kakutani | G06F 3/1236 |

* cited by examiner

*Primary Examiner* — Sam Bhattacharya
(74) *Attorney, Agent, or Firm* — Ferguson Braswell Fraser Kubasta PC (57) ABSTRACT

Systems and methods are disclosed for connection and disconnection of a shared audio endpoint. One method includes monitoring a connection between a first user mobile device and a shared audio endpoint. The method also includes making, while monitoring, a first determination that a signal strength of the connection between the first user mobile device and the shared audio endpoint is less than a disconnection threshold. Further, the method includes making, while monitoring, a second determination that an active communication stream does not exist between the first user mobile device and the shared audio endpoint. Still further, the method includes closing the connection between the shared audio endpoint and the first user mobile device in response to both the first determination and the second determination.

18 Claims, 8 Drawing Sheets

CONNECTION AND DISCONNECTION OF SHARED AUDIO ENDPOINT

CROSS-REFERENCE TO RELATED APPLICATIONS

This application claims benefit under 35 U.S.C. § 119 to U.S. Provisional Patent Application Ser. No. 62/657,627, filed on Apr. 13, 2018, entitled, "Call Audio Endpoint for Hoteling" and having the same inventor. U.S. Provisional Patent Application Ser. No. 62/657,627 is incorporated herein by reference in its entirety.

BACKGROUND

Bluetooth® wireless technology is a communication technology for devices to exchange data over short distance using radio waves. Bluetooth® wireless technology is owned by the Bluetooth Special Interest Group, located in Kirkland Wash. Since development, Bluetooth® wireless technology has been used for many different functions. One common function is the transference of audio signal between devices. For example, Bluetooth® wireless technology may be used for call and recorded audio streaming between a user mobile device and a shared audio endpoint. The shared audio endpoint has a speaker and, optionally, a microphone, to play and possibly record audio.

In order to use a shared audio endpoint, the user mobile device and the shared audio endpoint perform a pairing operation whereby both the user mobile device and the shared audio endpoint discover each other, exchange permissions for communicating, and store identifying information about each other in local memory. The shared audio endpoint and the user mobile device may be concurrently paired and disconnected from multiple devices. For communication, the shared audio endpoint and the user mobile device are first connected, and then may have audio signal transmitted between the devices. A shared audio endpoint may be shared amongst multiple user mobile devices, whereby the shared audio endpoint is paired with the multiple user mobile device. Even though shared, the shared audio endpoint is often limited to only being connected to a single user mobile device at a time.

In some cases, the user mobile device automatically connects to the shared audio endpoint when in Bluetooth® wireless technology range of the shared audio endpoint. Moreover, for the single user mobile device to stop being connected to the shared audio endpoint while still in Bluetooth® wireless technology range for communication, the user manually disconnects the user mobile device from the shared audio endpoint.

SUMMARY

In general, systems and methods are disclosed for connection and disconnection of a shared audio endpoint. In one aspect, a method includes monitoring a connection between a first user mobile device and a shared audio endpoint. The method also includes making, while monitoring, a first determination that a signal strength of the connection between the first user mobile device and the shared audio endpoint is less than a disconnection threshold. Further, the method includes making, while monitoring, a second determination that an active communication stream does not exist between the first user mobile device and the shared audio endpoint. Still further, the method includes closing the connection between the shared audio endpoint and the first user mobile device in response to both the first determination and the second determination.

In one aspect, a device comprises memory, and processing circuitry connected to the memory. The processing circuitry is configured to monitor a connection between a first user mobile device and a shared audio endpoint. Also, the processing circuitry is configured to make, while monitoring, a first determination that a signal strength of the connection between the first user mobile device and the shared audio endpoint is less than a disconnection threshold. Further, the processing circuitry is configured to make, while monitoring, a second determination that an active communication stream does not exist between the first user mobile device and the shared audio endpoint. Still further, the processing circuitry is configured to close the connection between the shared audio endpoint and the first user mobile device in response to both the first determination and the second determination.

In one aspect, a system comprises a charger, a Bluetooth® wireless technology interface, and processing circuitry connected to the charger and the Bluetooth® wireless technology interface. The processing circuitry is configured to detect a charging event of a user mobile device being electrically coupled to the charger. Also, the processing circuitry is configured to, in response to detecting the charging event, broadcast a beacon comprising a name of the shared audio endpoint. Further, the processing circuitry is configured to accept a connection request to connect the user mobile device to a shared audio endpoint based on the beacon.

In one aspect, a system comprises a charger, a Bluetooth® wireless technology interface, and processing circuitry connected to the charger and the Bluetooth® wireless technology interface. The processing circuitry is configured to detect a charging event of a user mobile device being electrically coupled to the charger. Also, the processing circuitry is configured to, in response to detecting the charging event, connect the user mobile device to the system via the Bluetooth® wireless technology interface.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to connections between a shared audio endpoint and a user mobile device. Specifically, one or more embodiments at least in part uses a signal strength of a Bluetooth Low Energy (BLE) signal to set the connection status. The BLE signal has less range than a standard Bluetooth® wireless technology connection. Thus, even though audio signal may be transmitted using the standard Bluetooth® wireless technology connection without quality loss, a connected user mobile device may be disconnected from the shared audio endpoint. As used throughout the application, the term audio signal and audio recording are any signal or recording, respectively, that at least includes and audio component and may also include other multimedia components, such as visual and tactile components.

By way of an example, consider the following scenario. Multiple users each have at least one corresponding mobile phone that the users use for work. The users may share a conference room that has a conference call device having a Bluetooth® wireless technology enabled speaker and microphone system for conference calls. When a set of users enter a conference room, the conference call device should connect to the user with the greatest signal strength. Thus, the user, from the collection of users that enters the conference room, who wants to user their mobile phone for a conference call only needs to place their mobile phone next to the conference call device. After the meeting and if the conference call is over, when the user leaves the conference room with their mobile phone to go to their office next door to the conference room, the conference call device should disconnect the Bluetooth® wireless technology connection from the user's mobile device. Thus, any call that the user receives is not connected via the user's mobile device back to the conference room that the user left. Rather, the call should be connected to the speaker in the user's office.

Figure 1:
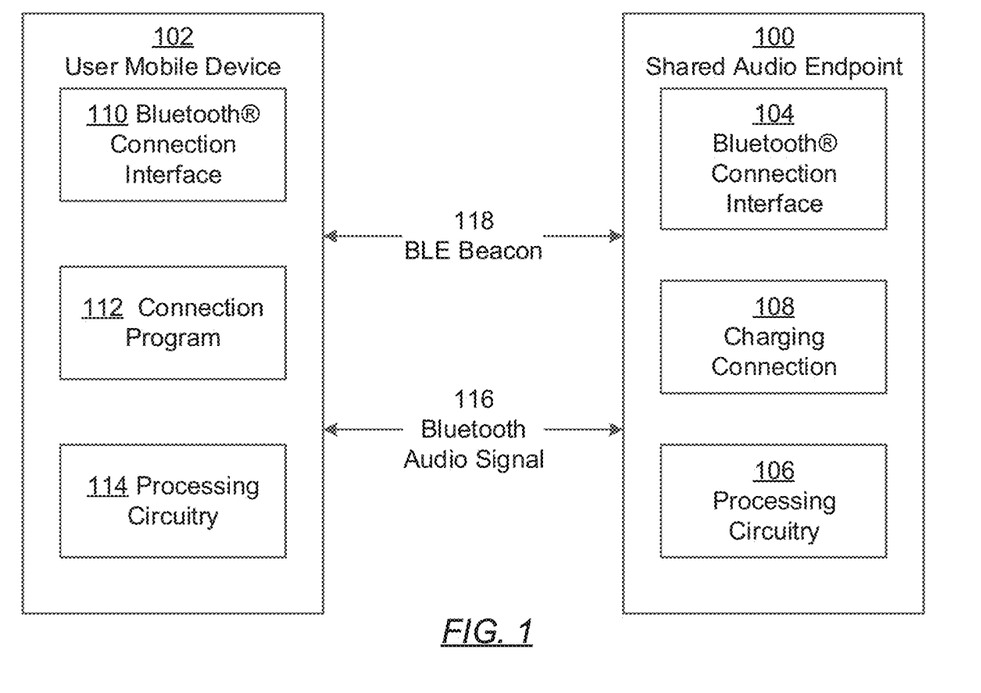
FIG. 1 shows a diagram of a system in accordance with one or more embodiments.

Turning now to the Figures, FIG. 1 shows a diagram of a system in accordance with one or more embodiments. As shown in FIG. 1, the system includes a shared audio endpoint (100) and a user mobile device (102). A shared audio endpoint (100) is a physical device that is an endpoint for an audio signal. In other words, the shared audio endpoint (100) is a device that is at least configured to convert between electrical audio signal and sound waves. As such, the shared audio endpoint (100) includes one or more microphones and/or one or more speakers. The one or more microphones and/speakers may be integrated within the housing of the shared audio endpoint and/or external to the housing, such as by being wired or wirelessly connected to the shared audio endpoint. For example, the shared audio endpoint may include an integrated speaker and microphone as well as a headset, whereby the headset has the speaker and microphone. In the example, the headset may be wired or wirelessly connected to the shared audio endpoint. In one or more embodiments, the shared audio endpoint (100) is configured to be concurrently shared amongst multiple user mobile devices (e.g., user mobile device (102)) (described below). In other words, the shared audio endpoint is able to be concurrently paired with multiple user mobile devices.

Continuing with the shared audio endpoint, the shared audio endpoint (100) at least includes a Bluetooth® wireless technology connection interface (104), processing circuitry (106), and, optionally, a charging connection (108). In one or more embodiments, the Bluetooth® wireless technology connection interface (104) is hardware that is configured to convert between electrical signal to radio signal in accordance with the Bluetooth® wireless technology standard. The processing circuitry (106) corresponds to hardware circuitry, such as one or more application specific integrated circuit (ASIC) and/or central processing unit (CPU) of the shared audio endpoint (100) that is configured to process instructions.

The charging connection (108) is an interface for charging the user mobile device (102). For example, the charging connection (108) may be a wireless charger, such as a charging pad containing an induction coil that can be aligned with a coil of the mobile device to charge the mobile device. By way of another example, the charging connection (108) may be a wired connector, such as a universal serial bus (USB) interface. In one or more embodiments, signal through the charging connection is only an electrical signal for charging the user mobile device (102) and not a data signal.

Although not shown, the shared audio endpoint (100) may include additional components. Such other components may include temporary and/or persistent storage, keypad, touchpad, touchscreen, display, and other user or phone interface.

A user mobile device (102) is a mobile device of a user that is in a path of the audio signal. For example, in the case of playback, the user mobile device (102) may have storage that stores an audio recording. In the case of a call, the user mobile device (102) is a device that connects to a cell network or other wireless network to connect the user to the call. For example, the user mobile device may be a mobile phone, a mobile computing system (e.g., a laptop computer, tablet, or other computing device), a gaming device, or other mobile device.

The user mobile device (102) includes a Bluetooth® wireless technology connection interface (110), processing circuitry (114), and a connection program (112). The user mobile device (102) may include additional components, such as a cellular modem, Wi-Fi interface, touch sensitive display, and/or one or more electromechanical buttons. Although not shown, the shared audio endpoint (100) may include additional components. Such other components may include temporary and/or persistent storage, keypad, touchpad, display, and other user or phone interface.

The Bluetooth® wireless technology connection interface (110) is hardware on the user mobile device (102) that is configured to convert between electrical signal to radio signal in accordance with the Bluetooth® wireless technology standard. The processing circuitry (114) on the user mobile device is hardware circuitry configured to process instructions, such as to provide or receive the audio signal via the Bluetooth® wireless technology connection interface (110).

Figure 7:
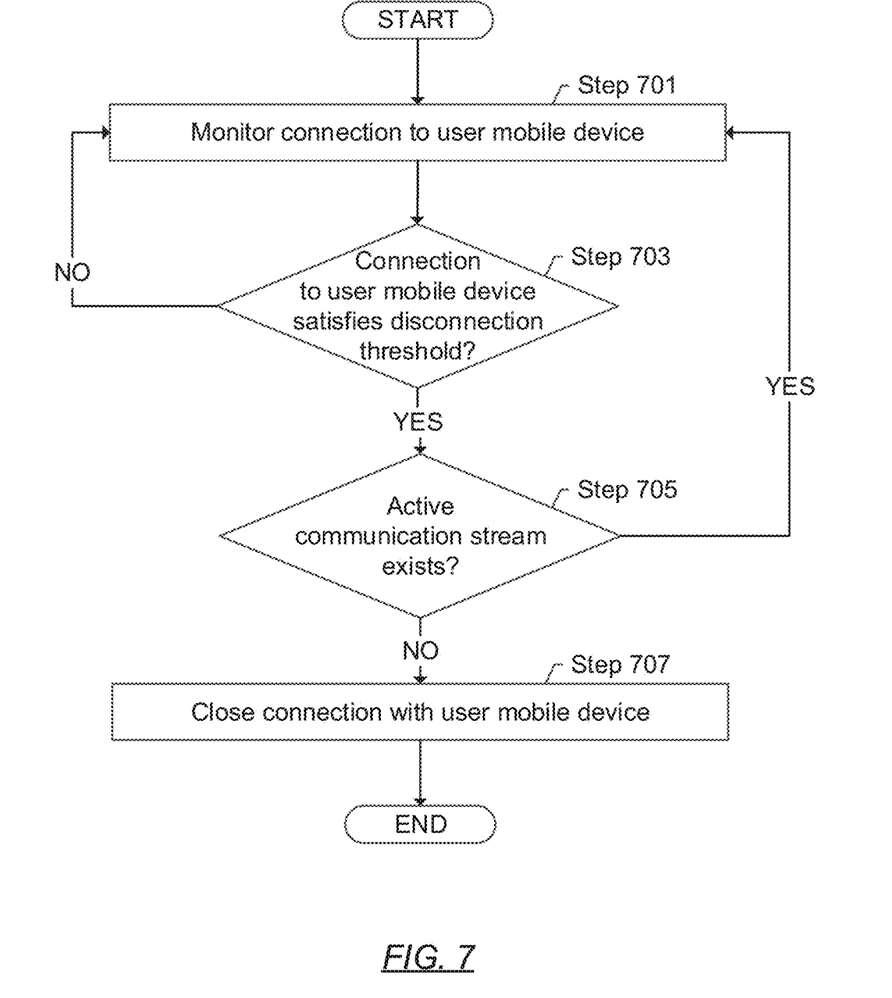

The processing circuitry may be configured to execute a connection program (112). The connection program (112) is software and/or firmware that is configured to implement the user mobile device side of the Bluetooth® wireless technology connection to the shared audio endpoint (100). For example, the connection program (112) may be a native program or an installed program that is configured to perform the functionality of FIGS. 2, 5, and/or 7.

The shared audio endpoint (100) and/or the user mobile device (102) are configured to transmit and/or receive a Bluetooth® wireless technology audio signal (116). The Bluetooth® wireless technology audio signal (116) is an audio signal transmitted via radio waves in accordance with the Bluetooth® wireless technology standard. In one or more embodiments, the Bluetooth® wireless technology audio signal (116) is transmitted using Bluetooth® wireless technology. Bluetooth® wireless technology is a point to point communication. The Bluetooth® wireless technology operates in the 2400-2483.5 mega Hertz (MHz) range within the industrial, scientific, and medical (ISM) 2.4 giga Hertz (GHz) radio frequency band. The Bluetooth® wireless technology may be basic rate and/or enhanced data rate Bluetooth® wireless technology. In the Bluetooth® wireless technology, the audio signal is split into packets and exchanged, as the Bluetooth® wireless technology audio signal (116), through one of seventy nine designated Bluetooth® wireless technology channels, whereby each channel has 1 MHz bandwidth. Additional data may be similarly transmitted via the Bluetooth® wireless technology.

The shared audio endpoint (100) and/or the user mobile device (102) are further configured to transmit and/or receive a BLE beacon (120). A BLE beacon is a radio signal transmitted intermittently that includes identifying information about the transmitter of the beacon, whereby the transmitter is either the shared audio endpoint (100) or user mobile device (102). In one or more embodiments, the BLE beacon is transmitted at regular intervals. For example, the interval may be ten times every second. BLE uses at most one megabit per second and consumes around 0.1 to 0.5 watts of energy. The identifying information may be a name, number, or address (e.g., media access control (MAC)) assigned to the transmitter.

Although FIG. 1 shows a single shared audio endpoint and a single user mobile device, multiple shared audio devices and user mobile devices may exist. For example, a single user may have multiple user mobile devices, multiple users may have multiple user mobile devices. Further, multiple shared audio endpoints may exist, where the multiple shared audio endpoints are within Bluetooth® wireless technology range of each other.

Turning now to the flowcharts, FIGS. 2, 3, 4, 5, 6, and 7 shows flowcharts in accordance with one or more embodiments. While the various steps in these flowcharts are presented and described sequentially, one of ordinary skill will appreciate that some or all of the steps may be executed in different orders, may be combined, or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 2:
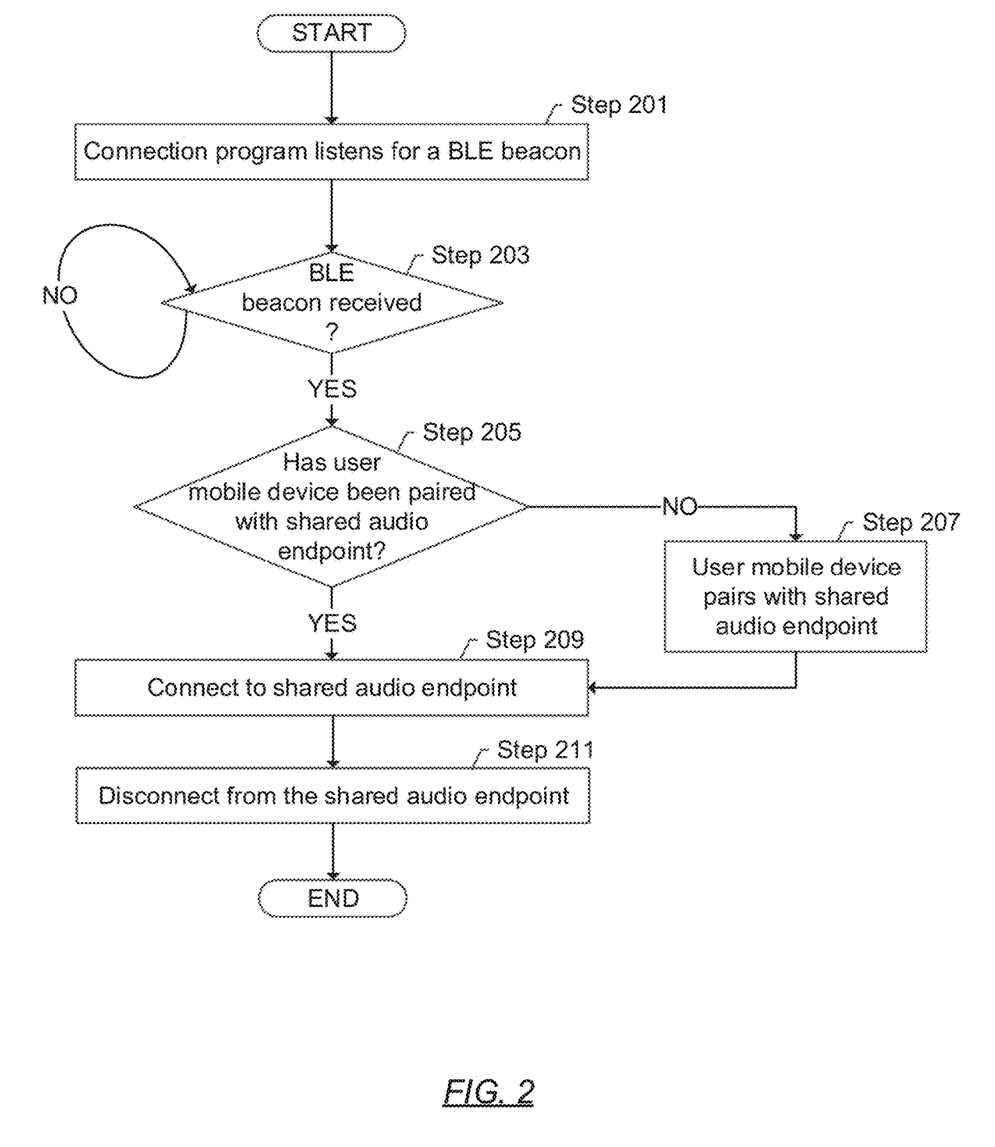
FIGS. 2, 3, 4, 5, 6, and 7 shows flowcharts in accordance with one or more embodiments.
Figure 3:
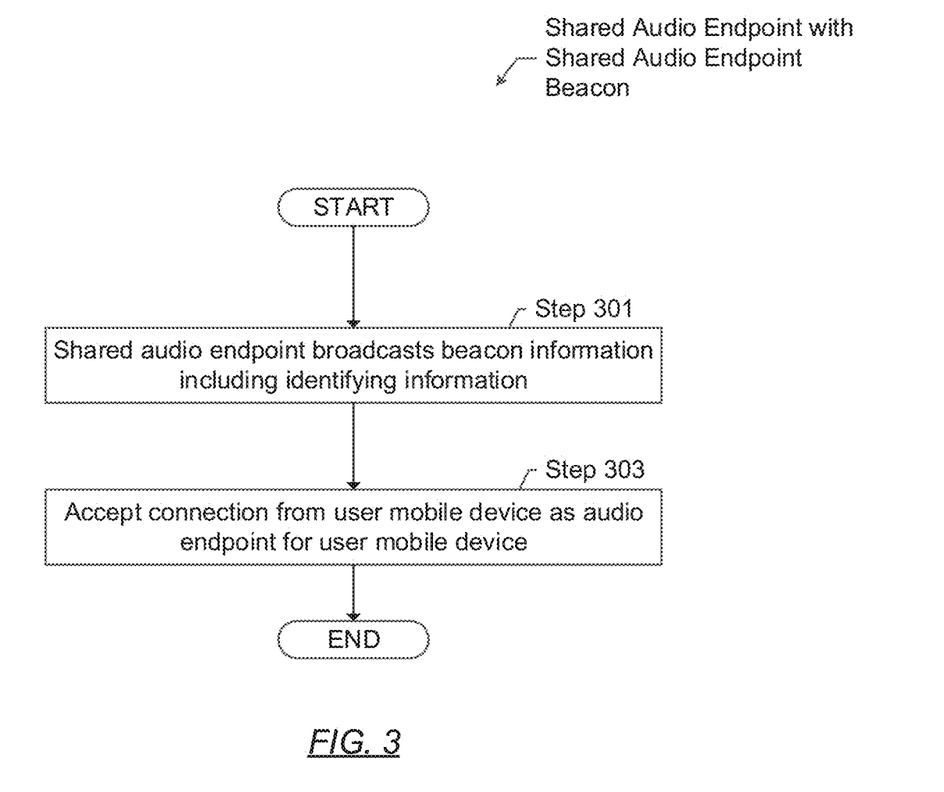
Figure 4:
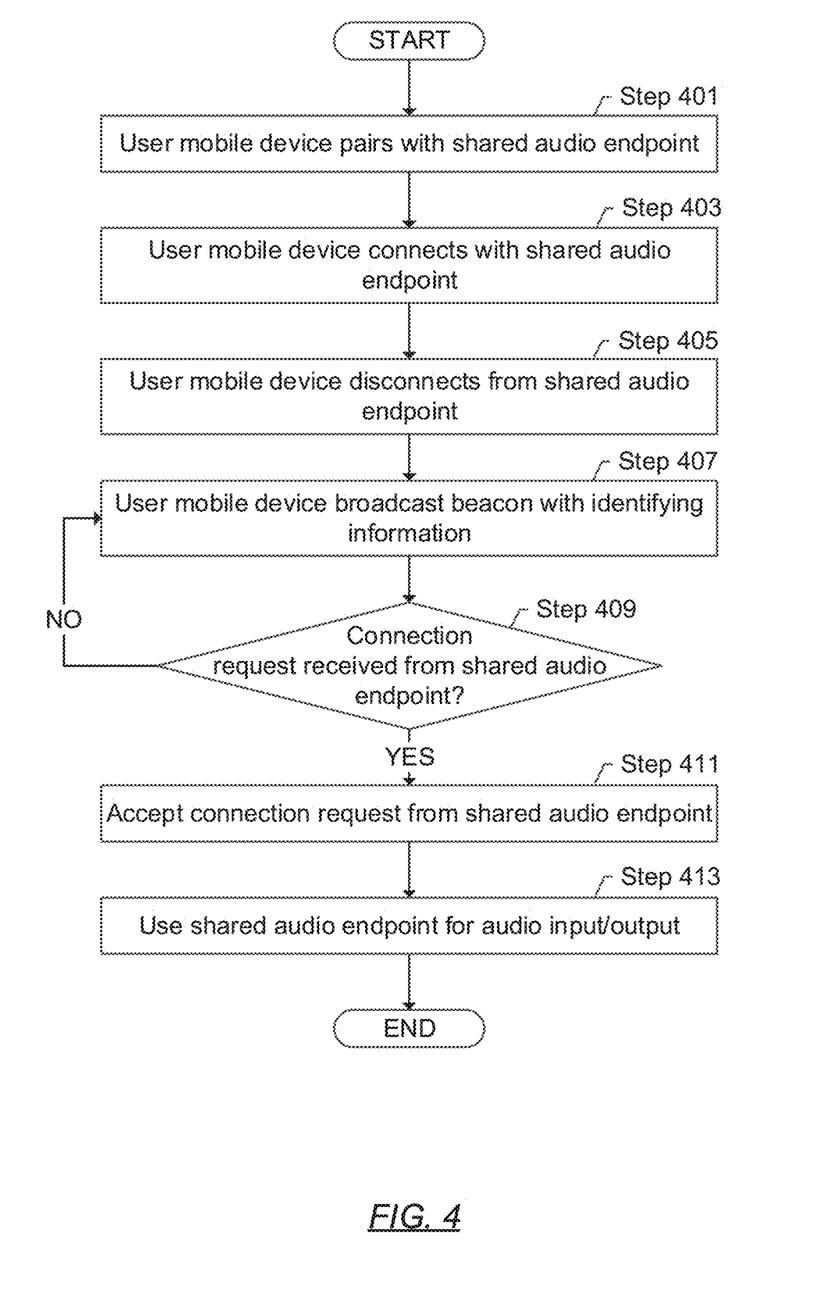
Figure 5:
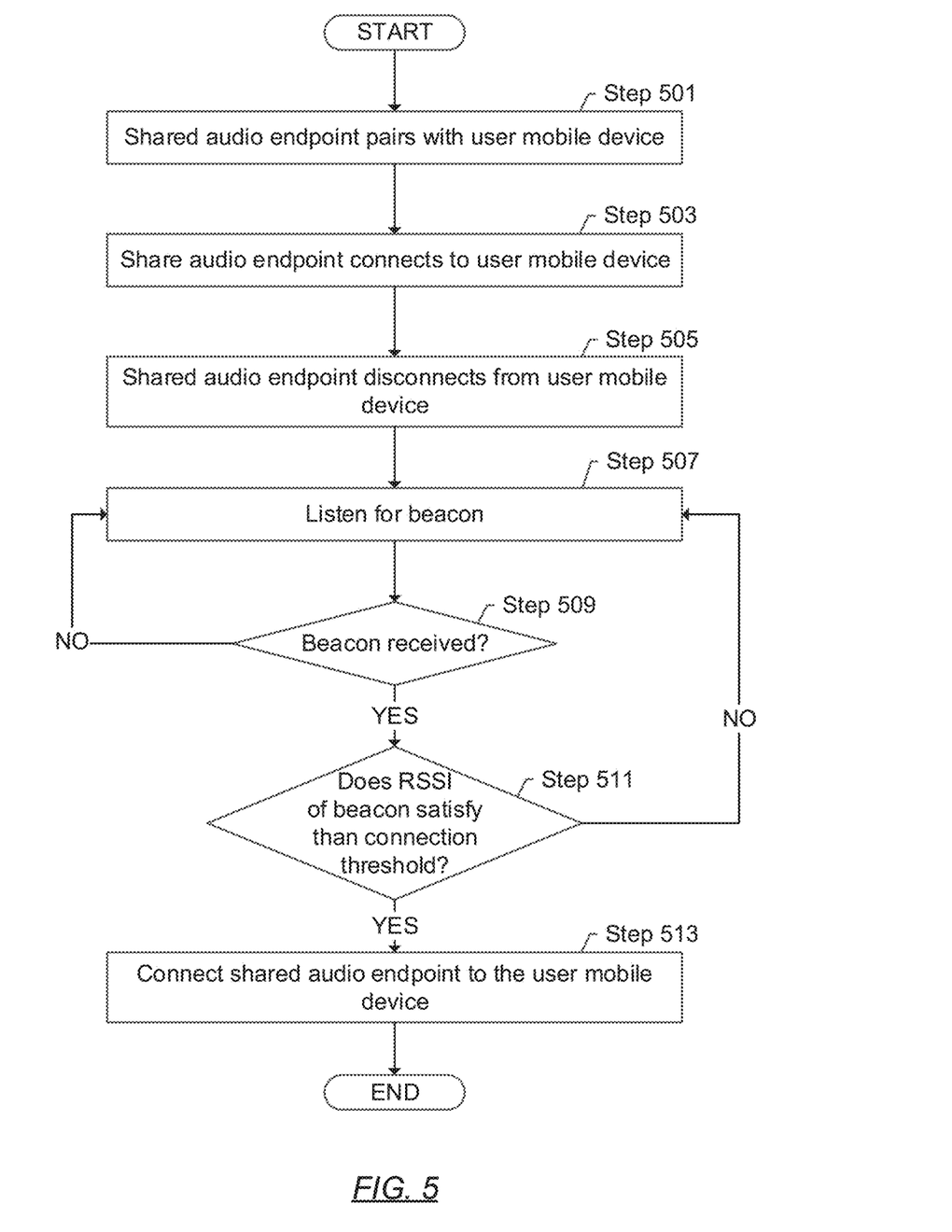
Figure 6:
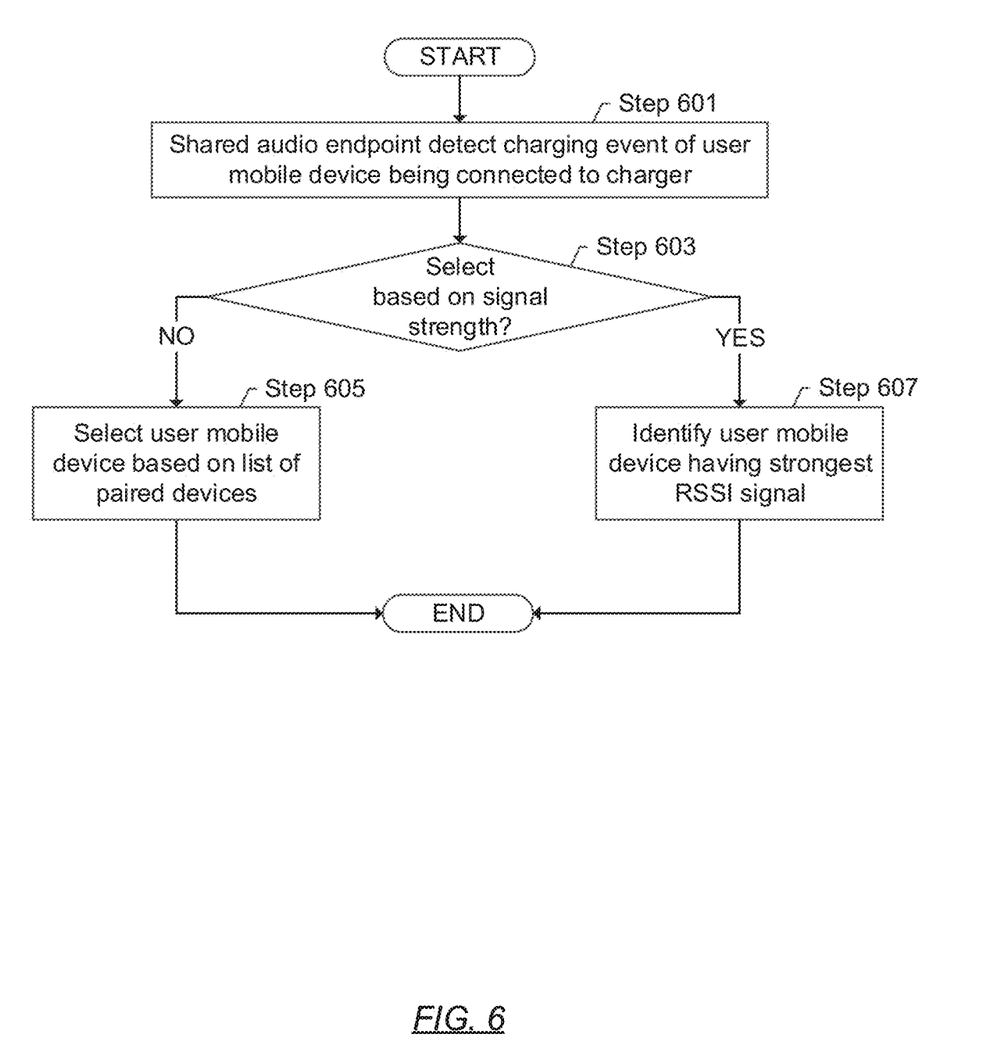

By way of an overview, FIG. 2 shows a flowchart from a user mobile device perspective with a shared audio endpoint broadcasting a BLE beacon. FIG. 3 shows a flowchart from the shared audio endpoint perspective with the shared audio endpoint broadcasting the beacon. FIG. 4 shows a flowchart from a user mobile device perspective with the user mobile device broadcasting a BLE beacon. FIG. 5 shows a flowchart from the shared audio endpoint perspective with the user mobile device broadcasting the beacon. FIG. 6 shows a flowchart with charging triggering the connection of the user mobile device to the shared audio endpoint. FIG. 7 shows a flowchart for disconnecting, by the shared audio endpoint, the user mobile device from the shared audio endpoint.

Turning to FIG. 2, in Step 201, the connection program on the user mobile device listens for a broadcast beacon. The connection program may be a background process executing on the user mobile device that regularly checks for a BLE beacon. As another example, the Bluetooth® wireless technology interface may trigger an interrupt to the connection program when a BLE beacon is received. In some embodiments, the connection program is specific to the shared audio endpoint. In such embodiments, the connection program may be preinstalled by a user, or installation may be triggered with the pairing process. For example, as part of an initial Bluetooth® wireless technology communication with the shared audio endpoint, the shared audio endpoint may trigger installation of the connection program on the user mobile device.

In Step 203, a determination is made whether a BLE beacon is received from the shared audio endpoint. As shown by the No arrow on Step 203 in FIG. 2, the connection program, periodically or based on an interrupt, determines whether a BLE beacon is received. Regardless, the user mobile device may continue processing other tasks.

If a BLE beacon is received, in Step 205, a determination is made whether the user mobile device has been paired with the shared audio endpoint. The BLE beacon is a broadcasted signal that includes the identifying information (described above) about the shared audio endpoint. The identifying information may be in a token of the beacon. Thus, the user mobile device may compare the identifying information with stored identifiers of paired devices to determine whether the user mobile device has been previously paired with the shared audio endpoint. Any previous pairing may be based on a received BLE beacon or triggered manually.

If the user mobile device is not previously paired with the shared audio endpoint, the user mobile device pairs with the shared audio endpoint in Step 207. The pairing process is performed in accordance with the Bluetooth® wireless technology protocol. The pairing is performed to establish a connection between the two devices to authorize the devices to communicate and store identifying information about each device in the respective set of known devices. To pair manually, the shared audio endpoint and/or the user mobile devices are set in a discoverable mode ("discoverable device"). If pairing based on the BLE beacon, the shared audio endpoint is in discoverable mode. The other device will request connecting with the discoverable device. The discoverable device provides a type of device and a name assigned to the device. After requesting connection, the devices exchange authentication information, such as one or more passkeys, which is then validated. If valid, then the devices are paired. The user mobile device and the shared audio endpoint store the identifying information about the user mobile device or the shared audio endpoint.

After pairing or if a determination is made that the devices are already paired, the user mobile device connects to the shared audio endpoint in Step 209. Specifically, the connection program sends a connection request to the shared audio endpoint. The connection allows for Bluetooth® wireless technology audio signals in accordance with Bluetooth® wireless technology to be transmitted between the shared audio endpoint and the user mobile device. In some embodiments, the user mobile device may be connected to only a single audio endpoint for transmitting audio signal at a time. In some embodiments, the shared audio endpoint may be connected to only a single user mobile device at a time. Thus, if the shared audio endpoint is an endpoint for phone calls, the shared audio endpoint only manages a single phone call at a time. In Step 211, the user mobile device disconnects from the shared audio endpoint. The disconnection may be performed manually or in accordance with the discussion below with reference to FIG. 7.

FIG. 3 shows a flowchart for the shared audio endpoint to connected to a user mobile device based on the shared audio endpoint issuing a broadcast beacon in accordance with one or more embodiments. In one or more embodiments, the shared audio endpoint only broadcasts a BLE beacon when the shared audio endpoint is not currently connected any user mobile device. In Step 301, the shared audio endpoint broadcasts beacon information including identifying information. The broadcast is a wide broadcast of a BLE beacon. Namely, a short radio signal is transmitted by the shared audio endpoint in accordance with BLE technology. In Step 303, the shared audio endpoint accepts a connection request from the user mobile device as the audio endpoint for the user mobile device. Accepting the connection request establishes a Bluetooth® wireless technology connection between the shared audio endpoint and the user mobile device. Thus, the shared audio endpoint and the user mobile device may communicate using Bluetooth® wireless technology. Disconnection may be performed manually or in accordance with FIG. 7.

FIGS. 4 and 5 show flowcharts for establishing a connection when the user mobile device broadcasts a BLE beacon. FIG. 4 shows a flowchart from the user mobile device perspective. In Step 401, the user mobile device pairs with the shared audio endpoint. Pairing with the shared audio endpoint may be manually triggered, triggered by a connection request from the shared audio endpoint (e.g., such as received after Step 409), or triggered by a connection program of the shared audio endpoint. In Step 403, the user mobile device connects with the shared audio endpoint. In Step 405, the user mobile device disconnects from the shared audio endpoint. The connection and disconnection from the shared audio endpoint may be performed as discussed above with reference to Steps 209 and 211 of FIG. 2.

In Step 407, the user mobile device broadcasts a beacon with identifying information. The beacon broadcasted by the user mobile device is a BLE beacon that uses only a short burst of radio signal that is distributed widely rather than point to point. For example, the connection program may trigger the intermittent broadcast of the BLE beacon.

In Step 409, a determination is made whether a connection request is received from the shared audio endpoint. For example, the connection program on the user mobile device may determine whether a shared audio endpoint transmitted a connection request. The connection request may be transmitted, for example, via Bluetooth® wireless technology. As shown by the No arrow from Step 409, the user mobile device may intermittently broadcast the beacon until a connection request is received or until an exit condition exists (not shown).

If a connection request is received, the user mobile device accepts the connection request from the shared audio endpoint in Step 411. Specifically, a Bluetooth® wireless technology connection is established between the user mobile device and the shared audio endpoint. In Step 413, the user mobile device uses the shared audio endpoint for audio input and/or output. In the case of a telephone call, the user mobile device uses the shared audio endpoint as a user interface for the call. Disconnection may be performed manually or in accordance with FIG. 7.

FIG. 5 shows a flowchart for the user mobile device to transmit the beacon from the shared audio endpoint perspective. In Step 501, the shared audio endpoint pairs with the user mobile device. The pairing with the shared audio endpoint may be manually triggered on shared audio endpoint, triggered by the beacon (e.g., such as received in Step 509), or triggered by the user mobile device. In Step 503, the shared audio endpoint connects with the user mobile device via a Bluetooth® wireless technology connection. In Step 505, the shared audio endpoint disconnects from the user mobile device. The connection and disconnection from the user mobile device may be performed as discussed above with reference to FIGS. 2 and 3.

In Step 507, the shared audio device listens for a beacon. In some embodiments, the shared audio device listens for a beacon only when the shared audio device is not connected to another user mobile device. In some embodiments, the shared audio device continually listens for a beacon regardless of whether only the shared audio device is connected to another user mobile device. For example, the Bluetooth® wireless technology connection interface may monitor radio waves to detect a BLE beacon. In some embodiments, the monitoring of a beacon is only with previously paired devices or known devices. Because the beacon includes identifying information, the shared audio endpoint is able to compare the identifying information with a set of stored identifiers to determine whether the beacon is received from a known device. In other embodiments, any BLE beacon received may trigger a possible connection after pairing is performed. A determination is made whether a beacon is received in Step 509. If a beacon is not received, the flow may continue with Step 507.

In Step 511, a determination is made whether the received signal strength indicator (RSSI) value satisfies a connection threshold. Specifically, a determination is made whether the RSSI value indicates at least a threshold level of signal strength that is predefined in the connection threshold. The RSSI value of the beacon is determined by the shared audio endpoint. The shared audio endpoint compares the RSSI value to the connection threshold. If the RSSI value is not greater than the connection threshold, the flow may return to Step 507 to continue to listen for a beacon. If the RSSI value satisfies the connection threshold, then the flow proceeds to Step 513.

In one or more embodiments, the connection threshold for the BLE beacon may be configurable. Further the connection threshold may be set higher than the level of data packet loss through Bluetooth® wireless technology connection. Specifically, the connection threshold may be set such that a user mobile device should be within the same room as the shared audio endpoint or within a few feet of the shared audio endpoint. For example, the connection threshold may be 90 in the range of 0-100, wherein 100 is the highest signal strength.

By enforcing a high connection threshold, the shared audio endpoint makes sure that user mobile device to which the shared audio endpoint is connecting is within the same vicinity as the shared audio endpoint. Thus, the shared audio endpoint may be used in an office sharing environment or a conferencing environment in which several shared audio endpoint devices and user mobile device may be within Bluetooth® wireless technology range of each other.

Moreover, if the RSSI value is set so high as to allow only a few feet to connect, the shared audio endpoint may be used in a conference room with multiple user mobile devices concurrently paired with the shared audio endpoint. In such a scenario, the user that wants to use their user mobile device for conferencing purposes only has to place their user mobile device within the few feet of the shared audio endpoint regardless of the order that the user mobile device enter Bluetooth® wireless technology range of the shared audio endpoint.

Continuing with FIG. 5, if the shared audio endpoint receives a beacon satisfying the connection threshold, the flow proceeds to Step 513. In Step 513, the shared audio endpoint connects to the user mobile device. Specifically, the shared audio endpoint sends a connection request to the user mobile device via Bluetooth® wireless technology signal. Although not shown in FIG. 5, In some embodiments, if multiple BLE beacons from different user mobile devices are received within a threshold interval of time, the shared audio endpoint may send the connection request to the user mobile device having the strongest RSSI signal that satisfies the connection threshold. Based on the connection request, the connection is established as described above in reference to FIG. 4. Disconnection may be performed manually or in accordance with FIG. 7.

FIG. 6 shows a flowchart for connecting based on a charging event. In Step 601, the shared audio endpoint detects a charging event of the user mobile device being connected to the charger. In particular, a sensor of the shared audio endpoint may detect the initiation of charging the user mobile device for charging, such as when the user mobile device is placed on the charging pad.

In Step 603, a determination is made whether to select a user mobile device for connection based on the signal strength. The shared audio endpoint may be preconfigured to select based on an ordered list or based on the signal strength. If based on the ordered list, the flow proceeds to Step 605, where the shared audio endpoint traverses the ordered list of paired user mobile devices to identify a first user mobile device in the ordered list that is within Bluetooth® wireless technology connection range of the shared audio endpoint. In some embodiments, the Bluetooth® wireless technology connection range also includes the RSSI value being greater than the connection threshold. In some embodiments, the Bluetooth® wireless technology connection range is such that a threshold number of packets are not dropped.

Returning to Step 603, if a determination is made to select based on the signal strength value, the flow proceeds to Step 607. In Step 607, the user mobile device having the strongest signal strength is selected. For example, based on the RSSI value, the signal strength of the user mobile devices is determined and used to select a user mobile device. In such a scenario, the user mobile device that is connected to the charger of the shared audio endpoint may be selected based on being the most adjacent to the shared audio endpoint.

In one or more embodiments, the shared audio endpoint may be configured to be in a personal mode. The configuration may be a user selectable option of the shared audio endpoint. In other words, the user selectable option may be to either be in shared mode or be in personal mode. In shared mode, a charging event may cause the shared audio endpoint to perform one or more of the Steps described above in reference to FIG. 6. However, in the personal mode, the shared audio endpoint may be paired or otherwise identify a single particular user mobile device to which the shared audio endpoint is to connect. Thus, the shared audio endpoint may automatically connect to the single user mobile device upon a charging event. Specifically, the charging event in the personal mode triggers the connection to the single particular user mobile device that is set in the personal mode. For example, upon detecting that a user mobile device has started to wirelessly charge from the shared audio endpoint, the shared audio endpoint may initiate the formation of a Bluetooth wireless link with the previously-paired user mobile device.

Once connection is established between the shared audio endpoint and the user mobile device, the connection may be monitored for a disconnection event. For example, the disconnection may be manual or based on an RSSI value. FIG. 7 shows a flowchart for determining when to disconnect by the shared audio endpoint. A similar set of steps may be performed by the user mobile device in accordance with one or more embodiments.

In Step 701, the connection to the user mobile device is monitored. In particular, the RSSI value of the Bluetooth® wireless technology connection is monitored. In Step 703, a determination is made whether the signal strength of the connection satisfies a disconnection threshold. In one or more embodiments, the RSSI value of the connection is monitored and determined whether the RSSI value satisfies a disconnection threshold. The RSSI value satisfies the disconnection threshold when the signal strength is less than the signal strength set forth in the disconnection threshold. Further, the disconnection threshold is set such that the signal strength is well above the signal strength that packets drop due to a weak signal starts to occur. For example, the disconnection threshold may be 50% of the signal strength above which packet drop occurs. By way of an example, the RSSI value may be set as 75 or lower. If the RSSI value does not satisfy the disconnection threshold, then the connection monitoring continues in Step 701.

If the connection satisfies the disconnection threshold, the flow proceeds to Step 705. In Step 705, a determination is made whether an active communication stream exists. Active communication occurs when packets of audio signal are continuing to be exchanged between the user mobile device and the shared audio endpoint using the Bluetooth® wireless technology. In other words, a determination is made whether a Bluetooth® wireless technology audio signal is being transmitted. If an active communication stream is determined to exist, the flow returns to Step 701 to continue to monitor the connection.

If the active communication stream does not exist, the flow proceeds to Step 707 to close the connection with the user mobile device. As such, the connection between the user mobile device and the shared audio device ends. As shown in FIG. 7, the connection ends when both the connection satisfies the disconnection threshold and an active communication stream does not exist. In other words, the failing to satisfy the disconnection threshold by itself does not trigger the disconnection of the user mobile device.

Although not shown, packet drop occurring due to a weak signal may also cause disconnection even when the active communication connection exists. Such an event may occur, for example, if the user mobile device is in an active communication with the shared audio endpoint and moving away from the shared audio endpoint. At a threshold distance that is much farther than the distance corresponding to the disconnection threshold, the shared audio endpoint is no longer within range that a Bluetooth® wireless technology connection may be maintained. In such a scenario, the connection is closed with the user mobile device.

Figure 8:
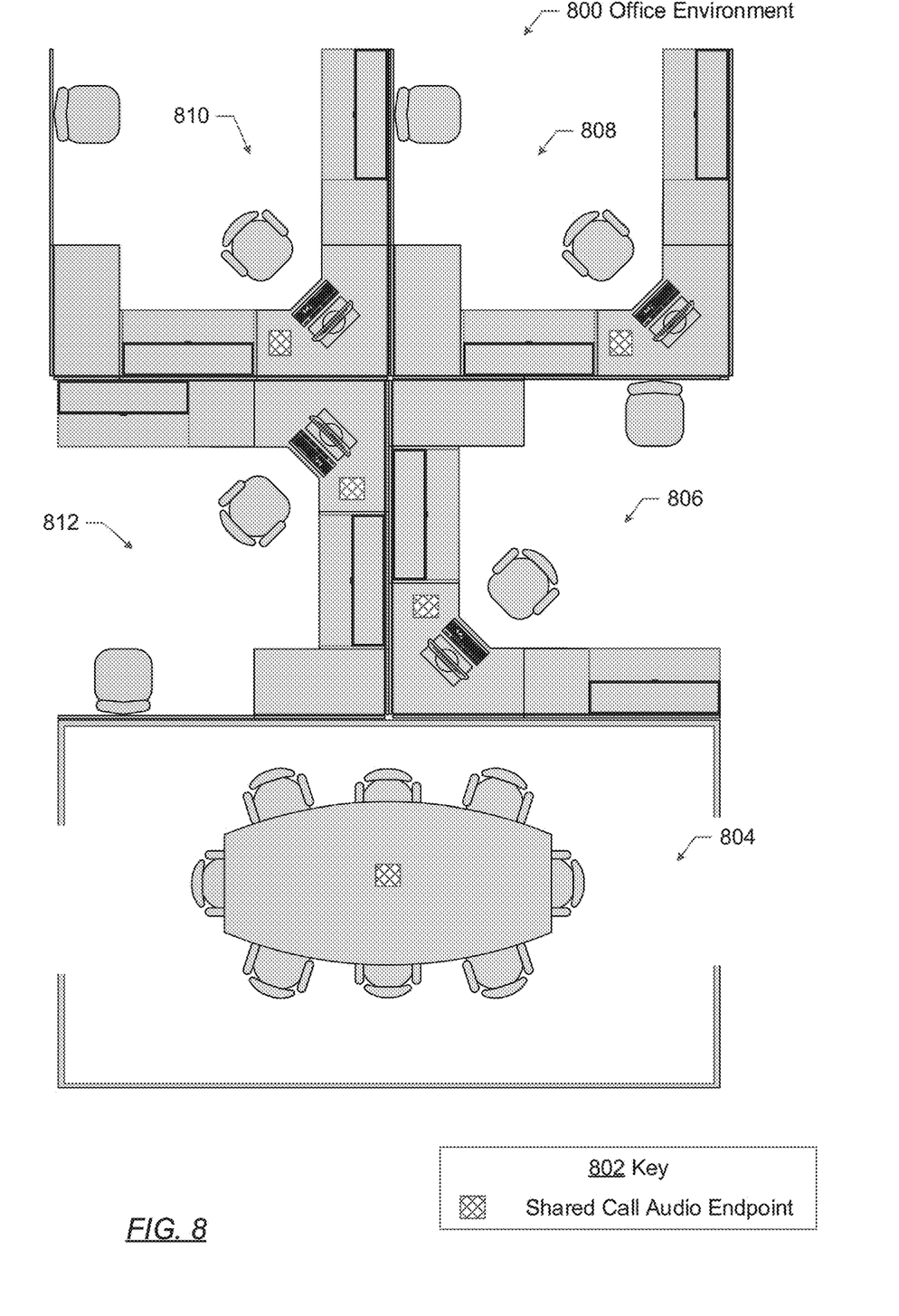
FIG. 8 shows an example in accordance with one or more embodiments.

The following example is for explanatory purposes only and not intended to limit the scope of the invention. As described above, one or more embodiments may be used in an office sharing environment in which shared call audio endpoints are shared between users. FIG. 8 shows an example of such an office environment (800) in accordance with one or more embodiments. In the example, a conference room (804) is adjacent to four work cubicles (806, 808, 810, 812). As shown by key (802), each of the conference room (804) and four work cubicles (806, 808, 810, 812) include a shared call audio endpoint. The shared call audio endpoint in the example is a device that has desk phone features while allowing users to use their mobile phones for calls. Thus, the user may keep the same phone number at their desk using their desk phone, continue conversations when leaving their desk using their desk phone, etc. Further, without configuration besides pairing, the users may continue to use the phone number of their mobile phone and have the keypad, speaker phone, handset, and interface of a desk phone. The shared call audio device may further include a headset with a built in microphone.

Because of the adjacency of the conference room (804) and four work cubicles (806, 808, 810, 812) along with the open office design, the various shared call audio devices are within Bluetooth® wireless technology range of each other. In other words, packet drop does not occur due to the signal strength. Thus, under standard methods, when a user moves from one of the cubicles to the other or from the conference room back to a desk, the user's mobile phone is still connected to the prior connected shared audio device.

By way of an example of one or more embodiments, consider the scenario in which Ted gets to work first and wants to work at cubicle (810). Fred gets to work next and selects cubicle (812). Ann and Fran select cubicle (808) and cubicle (806), respectively. Each user, when they arrive, place their mobile phones on the charging pad of the cubicles respective shared call audio endpoint. Because of the charging event, a Bluetooth® wireless technology connection is established between the respective shared call audio endpoint and the user's mobile phone. For example, the charging event may cause the shared call audio endpoint to select the user's mobile phone according to the RSSI value. Thus, the users make calls by using the handset and headset of the respective shared call audio endpoint, and the call is routed through the user's mobile phone.

Continuing with the example, Fred and Ann have a meeting in the conference room 804. When Ann leaves her cubicle (808), the RSSI value is less than the disconnection threshold, so Ann's mobile phone disconnects from her shared call audio endpoint. The shared call audio endpoint of the conference room (804) issues a BLE beacon, which triggers Ann's mobile phone to connect. She and Fred have a conference call with others not at the office using Ann's mobile phone. Even if, while having her mobile phone (e.g., in her pocket), she briefly returns to cubicle (808) during the conference call to get her computer from her desk, the conference call does not disconnect from the shared call audio endpoint of the conference room (804) because an active communication stream is determined to exist.

At the end of the conference call, Ann and Fred leave the conference room (804). Because a call does not exist (i.e., no active communication stream), the shared call audio endpoint of the conference room (804) disconnects. Thus, Ann's mobile phone is free to connect back to the shared call audio endpoint in cubicle (808). The shared call audio endpoint in the conference room (804) is then available to connect to another mobile device, such as Fran or Ed's mobile phone in a subsequent conference call.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   monitoring a connection between a first user mobile device and a shared audio endpoint;
   making, while monitoring, a first determination that a signal strength of the connection between the first user mobile device and the shared audio endpoint is less than a disconnection threshold;
   making, while monitoring, a second determination that an active communication stream does not exist between the first user mobile device and the shared audio endpoint; and
   closing the connection between the shared audio endpoint and the first user mobile device in response to both the first determination and the second determination.

2. The method of claim 1, further comprising:
   broadcasting a beacon information comprising a name; and
   accepting a connection request from the first user mobile device as an audio endpoint for the first user mobile device.

3. The method of claim 2, further comprising:
   pairing with the first user mobile device prior to accepting the connection request.

4. The method of claim 2, wherein broadcasting the beacon information uses Bluetooth Low Energy.

5. The method of claim 1, further comprising:
   making, while monitoring, a third determination that the signal strength of the connection between the first user mobile device and the shared audio endpoint is less than the disconnection threshold;
   making, while monitoring, a fourth determination that the active communication stream exists between the first user mobile device and the shared audio endpoint; and
   continuing monitoring the connection between the first user mobile device and the shared audio endpoint based on the fourth determination despite the third determination.

6. The method of claim 1, further comprising:
   listening for a beacon comprising a token;
   in response to the beacon being received, making a third determination that a signal strength of the beacon is greater than a connection threshold; and
   connecting the shared audio endpoint to the first user mobile device in response to the third determination.

7. The method of claim 1, further comprising:
   listening for a beacon comprising a token;
   in response to a first beacon from the first user mobile device and a second beacon from a second user mobile device being concurrently received, making a third determination that a signal strength of the first beacon and a signal strength of the second beacon are both greater than a connection threshold;

in response to the third determination, making a fourth determination that the signal strength of the first beacon is greater than the signal strength of the second beacon; and connecting the shared audio endpoint to the first user mobile device in response to the fourth determination.

8. The method of claim 1, further comprising:

detecting a charging event of the first user mobile device being connected to a charger of the shared audio endpoint; and in response to detecting the charging event, connecting the first user mobile device to the shared audio endpoint.

9. The method of claim 8, further comprising:

selecting, in response to detecting the charging event and from a plurality of user mobile devices, the first user mobile device according to a signal strength of a received signal from each of the plurality of user mobile devices, wherein connecting the first user mobile device is further in response to the selecting.

10. A device comprising:

memory; and processing circuitry connected to memory, and configured to:

monitor a connection between a first user mobile device and a shared audio endpoint, make, while monitoring, a first determination that a signal strength of the connection between the first user mobile device and the shared audio endpoint is less than a disconnection threshold, make, while monitoring, a second determination that an active communication stream does not exist between the first user mobile device and the shared audio endpoint, and close the connection between the shared audio endpoint and the first user mobile device in response to both the first determination and the second determination.

11. The device of claim 10, wherein the processing circuitry is further configured to:

broadcast a beacon information comprising a name; and accept a connection request from the first user mobile device as an audio endpoint for the first user mobile device.

12. The device of claim 10, wherein the device is the shared audio endpoint.

13. The device of claim 10, wherein the processing circuitry is further configured to:

make, while monitoring, a third determination that the signal strength of the connection between the first user mobile device and the shared audio endpoint is less than the disconnection threshold;

make, while monitoring, a fourth determination that the active communication stream exists between the first user mobile device and the shared audio endpoint; and continue monitoring the connection between the first user mobile device and the shared audio endpoint based on the fourth determination despite the third determination.

14. The device of claim 10, wherein the processing circuitry is further configured to:

listen for a beacon comprising a token;

in response to the beacon being received, make a third determination that a signal strength of the beacon is greater than a connection threshold; and connect the shared audio endpoint to the first user mobile device in response to the third determination.

15. The device of claim 10, wherein the processing circuitry is further configured to:

listen for a beacon comprising a token;

in response to a first beacon from the first user mobile device and a second beacon from a second user mobile device being concurrently received, make a third determination that a signal strength of the first beacon and a signal strength of the second beacon are both greater than a connection threshold;

in response to the third determination, make a fourth determination that the signal strength of the first beacon is greater than the signal strength of the second beacon; and connect the shared audio endpoint to the first user mobile device in response to the fourth determination.

16. The device of claim 10, wherein the processing circuitry is further configured to:

detect a charging event of the first user mobile device being connected to a charger of the shared audio endpoint; and in response to detecting the charging event, connect the first user mobile device to the shared audio endpoint.

17. The device of claim 16, wherein the processing circuitry is further configured to:

select, in response to detecting the charging event and from a plurality of user mobile devices, the first user mobile device according to a signal strength of a received signal from each of the plurality of user mobile devices, wherein connecting the first user mobile device is further in response to the selecting.

18. The device of claim 10, wherein the processing circuitry is further configured to:

listen for a beacon comprising a token;

in response to the beacon being received, make a third determination that a signal strength of the beacon is greater than a connection threshold; and connect the shared audio endpoint to the first user mobile device in response to the third determination.

* * * * *